C. A. MULLER.
CHICKEN FOUNTAIN.
APPLICATION FILED FEB. 23, 1917.

1,228,230.

Patented May 29, 1917.

WITNESSES
Oliver W. Holmes
E. B. Marshall

INVENTOR
Charles A. Muller
BY
ATTORNEYS

UNITED STATES PATENT OFFICE.

CHARLES ALFONSO MULLER, OF PUEBLO, COLORADO.

CHICKEN-FOUNTAIN.

1,228,230.

Specification of Letters Patent. Patented May 29, 1917.

Application filed February 23, 1917. Serial No. 150,570.

*To all whom it may concern:*

Be it known that I, CHARLES A. MULLER, a citizen of the United States, and a resident of Pueblo, in the county of Pueblo and State of Colorado, have invented a new and Improved Chicken-Fountain, of which the following is a full, clear, and exact description.

My invention has for its object to provide a chicken fountain which will feed automatically, and one which will prevent the water contained therein from freezing in zero weather.

Additional objects of the invention will appear in the following specification in which the preferred form of the invention is disclosed.

In the drawings similar reference characters denote similar parts in all the views, in which—

Figure 2:
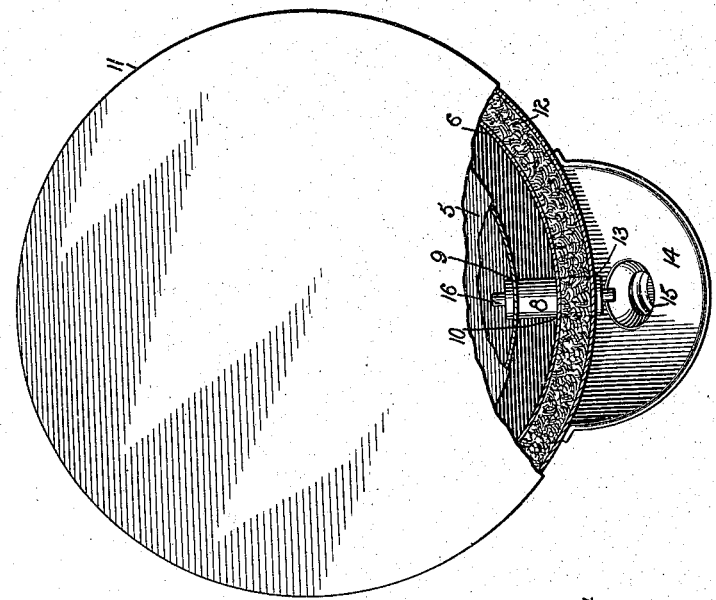
Fig. 2 is a plan view of Fig. 1, with parts broken away to illustrate the construction.
Figure 1:
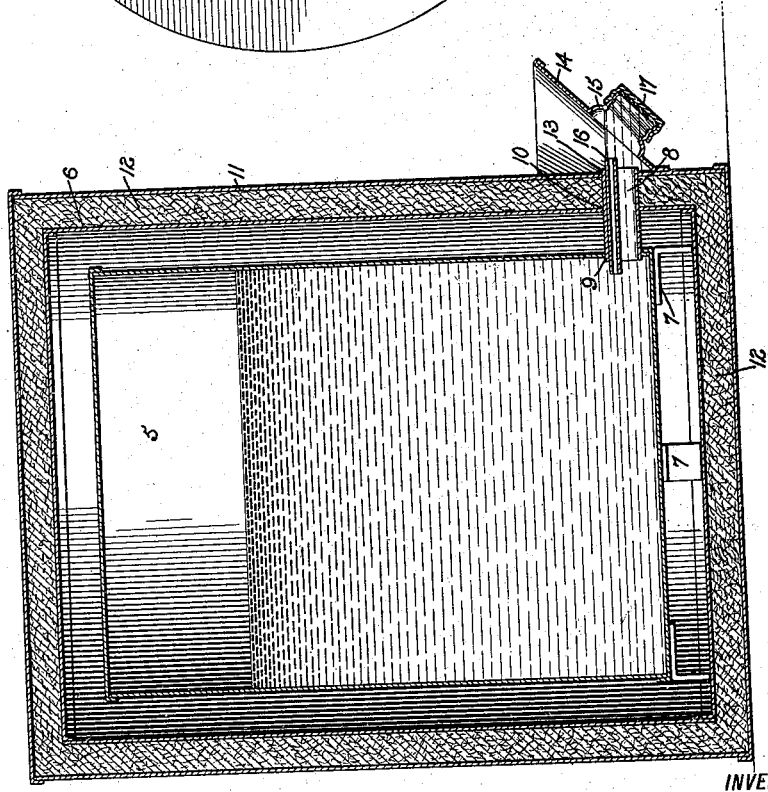
Figure 1 is a sectional side elevation showing the invention.

By referring to the drawings, it will be seen that a receptacle for water 5 is provided which is disposed in a casing 6, the casing 6 being larger than the water receptacle 5, so that there is an air space between the water receptacle 5 and the casing 6. The water receptacle 5 is supported on brackets 7, to space the bottom of the water receptacle against the bottom of the casing 6. These brackets 7 also prevent the water receptacle 5 from being displaced. A water outlet pipe 8 is disposed in an opening 9 in the water receptacle 5 and in an opening 10 in the casing 6, the water outlet pipe 8 being sealed to the water receptacle 5 around the opening 9, and to the casing 6 around the opening 10. Air is removed from the space between the water receptacle 5 and the casing 6 to form a vacuum, or a partial vacuum, in the said space. The casing 6 is disposed within a larger casing 11, and the space between the casing 6 and the casing 11 is filled with a non-conducting material 12. The water outlet pipe 8 projects out through an opening 13 in the casing 11.

Secured to the side of the casing 11, below and at the side of the water outlet pipe 8, there is a cup 14, this cup 14 extending a distance above the water outlet pipe 8. The cup 14 has a nipple 15 substantially in alinement with the water outlet pipe 8, so that a funnel may be introduced into the water outlet pipe 8, through this nipple 15, by which means the water receptacle 5 may be filled. Disposed within and secured to the water outlet pipe 8 there is an air outlet pipe 16 which permits the air to escape from within the water receptacle 5 when the said water receptacle is filled by introducing water through the pipe 8. After the water receptacle 5 has been filled, the nipple 15 is closed by means of a cap 17.

Having thus described my invention, I claim as new, and desire to secure by Letters Patent:—

1. A fountain having an outlet in its side, a cup secured to the fountain below the outlet and having its front and side walls extending above the outlet, the front wall of the cup diverging upwardly relatively to the side wall of the fountain, there being an opening in the front of the cup at the bottom thereof and substantially in alinement with the outlet, and means to close the opening.

2. A fountain having a water outlet in its side, a cup secured to the fountain below the water outlet and extending above the said outlet, there being an opening in the cup substantially in alinement with the water outlet, means to close the opening, and an air outlet pipe extending through the first outlet for connecting the interior of the fountain with the cup to permit of the escape of air from the fountain when water is introduced into the fountain through the first outlet.

3. A fountain having walls constructed of non-heat-conducting material, there being an outlet in the side of the fountain, a cup secured to the fountain below the outlet and extending above the said outlet, there being an opening in the cup substantially in alinement with the water outlet, means to close the opening, and an air outlet pipe extending through the first outlet for connecting the interior of the fountain with the cup to permit of the escape of air from the fountain when water is introduced into the fountain through the first outlet.

CHARLES ALFONSO MULLER.

Copies of this patent may be obtained for five cents each, by addressing the "Commissioner of Patents, Washington, D. C."